United States Patent [19]
King

[11] 3,932,351
[45] *Jan. 13, 1976

[54] METHOD OF PREPARING PHOSPHORUS-BROMINE CONTAINING FIRE RETARDANT POLYESTER FIBERS

[75] Inventor: Henry L. King, Cary, N.C.
[73] Assignee: Monsanto Company, Decatur, Ala.
[ * ] Notice: The portion of the term of this patent subsequent to Mar. 13, 1992, has been disclaimed.
[22] Filed: Apr. 8, 1971
[21] Appl. No.: 132,369

[52] U.S. Cl............ 260/45.7 P; 260/75 P; 260/860
[51] Int. Cl.² ........................................ C08K 5/53
[58] Field of Search............ 260/45.7 P, 47 P, 860, 260/930, DIG. 24

[56]  References Cited
UNITED STATES PATENTS

| | | | |
|---|---|---|---|
| 2,572,076 | 10/1951 | Toy..................... | 260/61 |
| 2,682,522 | 6/1954 | Coover, Jr. et al............ | 260/47 |
| 3,027,349 | 3/1962 | Bahr et al................. | 260/45.7 |
| 3,053,878 | 9/1962 | Friedman et al............ | 260/927 |
| 3,406,224 | 10/1968 | McDonough............... | 260/860 |
| 3,535,300 | 10/1970 | Gable..................... | 260/29.1 |
| 3,583,938 | 6/1971 | Okada et al............... | 260/45.9 |
| 3,584,074 | 6/1971 | Shima et al............... | 260/857 |

OTHER PUBLICATIONS
Hilado, Flammability Handbook For Plastics, 1969, pp. 82–86.

Primary Examiner—Donald E. Czaja
Assistant Examiner—R. A. White
Attorney, Agent, or Firm—Thomas Y. Awalt, Jr.

[57] ABSTRACT

Fire retardant qualities are incorporated into polyester fibers by adding to the polymer, prior to spinning thereof into filaments, not more than 25 percent, based on the weight of the polymer, of a compound having the general formula:

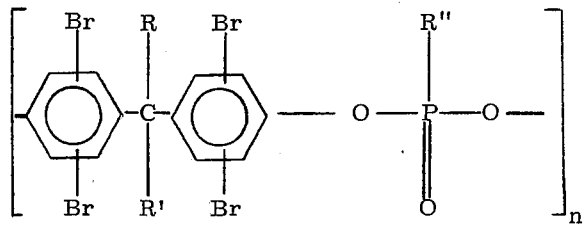

where R and R' are radicals selected from the group consisting of hydrogen, methyl, ethyl, aryl, and brominated aryl; where R'' is a radical selected from the group consisting of alkyl, aryl, and brominated aryl; and where $n$ is an integer of from 1 to about 100.

6 Claims, No Drawings

METHOD OF PREPARING PHOSPHORUS-BROMINE CONTAINING FIRE RETARDANT POLYESTER FIBERS

This invention relates to polyesters produced by condensation reactions of polymethylene glycols and dicarboxylic acids or reactive derivatives thereof.

It is well known that the polymeric polyesters prepared by the condensation of a glycol or its functional derivatives and a dicarboxylic acid or polyester-forming derivative thereof, such as an acid halide, a salt, or a simple ester of a dibasic acid and volatile monohydric alcohol are excellent fiber-forming polymers. Commercially, highly polymeric polyesters are prepared, for example, by the condensation of terephthalic acid or dimethyl terephthalate and a polymethylene glycol containing from about 2 or 10 carbon atoms, and particularly ethylene glycol, generally as taught in U.S. Pat. No. 2,465,319 and improvements thereon. These polyesters are relatively insoluble, chemically inactive, hydrophobic materials capable of being formed into filaments which can be cold-drawn to produce textile fibers of superior strength and pliability. It has long been considered desirable to impart flame retardant qualities in these polyester fibers so that fabrics, particularly those containing natural fibers such as cotton, might thereby be rendered nonburnable. A wide variety of techniques have been employed to produce flame retardancy in polyesters, including the co-polymerization and transesterification of monomers which contain halogen and phosphorus, and the incorporation of these elements into the polymer by means of additives or carriers.

By adding the phosphorus-halogen containing compound while the polymer is is melt phase, the compound, or the fire resisting elements thereof more likely remain in the fiber, even when exposed to subsequent washing or dry cleaning operations.

Phosphorus, bromine and chlorine have long been known as fire retardant elements, particularly adaptable for use in polymeric materials. These elements have been introduced into the polymers through a number of compounds; the problem of introduction being one of compatibility with the polymeric material and reaction. Incompatibility, of course, results in degradation or alteration of the polymer. Bromine, chlorine and phosphorus, as elements, cannot be added to polyethylene terephthalate prior to spinning without causing serious degradation.

The addition of low molecular weight compounds to polyesters in melt form is disadvantageous usually because the volatility of the compound will cause it to be removed by distillation; it may act as a plasticizer for the polymer to such an extent that the polymer cannot be spun into fiber; and it may cause the melting point of the polymer to be lowered to such an extent that it will have limited use when spun into fibers. These disadvantages may be overcome if the elements of phosphorus and halogen are part of a larger molecule such as a polymeric material. This polymeric additive need not be compatible with the polyester in the sense that it could or would become a part of the polyester chain. It is advantageous that the phosphorus and halogen be introduced in one compound not only for convenience, but because it is believed that a synergistic action results so that lesser amounts of the additive is required than would otherwise be necessary.

It is an object of this invention to provide a compound suitable for use as a fire retardant additive in polyethylene terephthalate.

It is another object of this invention to provide a method of preparing fire retardant polyethylene terephthalate fibers.

Briefly the objects of this invention are accomplished by adding, prior to the spinning of the polyethylene terephthalate polymer into filaments, not more than about 20 percent, based on the weight of the polymer, of a compound having the general formula:

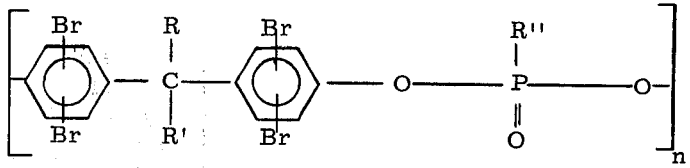

where R and R' are radicals selected from the group consisting of hydrogen, methyl, ethyl, aryl, and brominated aryl; where R" is a radical selected from the group consisting of alkyl, aryl, and brominated aryl; and where $n$ is an integer of from 1 to about 100.

By polyester fibers, as used herein, is meant a manufactured fiber in which the fiber-forming substance is any long chain synthetic polymer composed of at least 85 percent polymerization weight of an ester of a dihydric alcohol and terephthalic acid.

I have discovered that these phosphonates which are brominated via aryl or aromatic rings, do not cause serious degradation of the polyester polymer, or otherwise interfere with the polymerization reaction; and they are more hydrolytically stable than the apparently somewhat similar alkoxy phosphates already taught as fire retardant additives for polyester fibers. Compounds, such as these, which are brominated via alifatic radicals are too unstable for use as a polymer additive.

Poly(tetrabromobisphenol-A)-phenyl phosphonate, for example, can be prepared by heating with stirring equimolar amounts of phenyl phosphonic dichloride and tetrabromobisphenol-A, until a homogenous liquid remains. Heating is continued and about 175°C. hydrogen chloride is evolved. Heating is continued with gradual increase in temperature until a polymeric material is present and hydrogen chloride evolution ceases. The polymeric material is allowed to cool and solidifies into a glassy mass which is finally ground, washed thoroughly with water, dilute caustic solution, again with water and finally with methanol. This treatment removes the unreacted starting materials. The product obtained is dissolved in chloroform, washed with water, treated with carbon and the polymer recovered by pouring the chloroform solution into methanol with rapid stirring. The polymer is a nearly white solid melting at about 215°–225°C. Molecular weight was about 2200.

The additive may be added at any convenient stage prior to spinning. Up to about 20% based on the final weight of the modified polymer can be tolerated. A minimum effective level is about 10%. As the level reaches 20, a pronounced weakness in the fiber is found. About 15% of the additive is preferred. This should provide about 5–12% bromine in the fiber. Preferred bromine and phosphorus content is about 7% and 0.7% respectively.

EXAMPLE

A 900 ml. capacity polyester autoclave was charged with 147 g. terephthalic acid, 300 ml. ethylene glycol, and 0.1 g. of antimony glycoloxide and the system purged with nitrogen. Heating was applied to the enclosed system, and when the temperature inside the autoclave had reached 100°C. to 125°C., the stirrer was started. When the temperature inside the autoclave had reached about 230°–235°C. (the pressure being about 25 p.s.i.g.), the off-vapor valve was adjusted to maintain these conditions of temperature and pressure. Water from the esterification step and some ethylene glycol were continually removed for a period of about 60 minutes. The pressure in the system was adjusted to atmospheric pressure and the heating rate continued up to a temperature of 280°C. during which time excess glycol is distilled off. 30 grams of poly-(tetrabromobisphenol-A) phenyl phosphonate were added to the autoclave through an addition put atop the autoclave. Pressure in the autoclave was maintained at about 2 mm. or less until a polymer having a specific viscosity of about 0.3 was formed. The polymer was extruded through a spinnerette and the filaments obtained were drawn about 5 times their original length over a hot pin at about 80°C. The drawn fiber has an ivory color and melted at 236°C.

The drawn fiber obtained above was plied with glass fiber and knit into tubing of about 34 courses per inch.

The technique of plying thermoplastic materials such as poly (ethylene terephthalate) with glass fiber and knitting into tubing prevents the polyester from pulling away from a flame and thus failing to propagate a flame when tested on standard flammability testers. When a flame was allowed to impinge on the modified polyester above, inclined at an angle of about 45° from the horizontal, the tubing ignited briefly after which the flame went out and was not propagated. In contrast, a polyester control sample in which the flame retardant was omitted burned rapidly, burning a distance of about 8–10 inches from the point of ignition in a period of 7–8 seconds.

I claim:

1. Synthetic fibers in which the fiber forming substance is any long chain synthetic polymer composed of at least 85% by weight of an ester of dihydric alcohol and terephthalic acid containing not more than 20% based on the weight of the polymer, of a compound having the general formula:

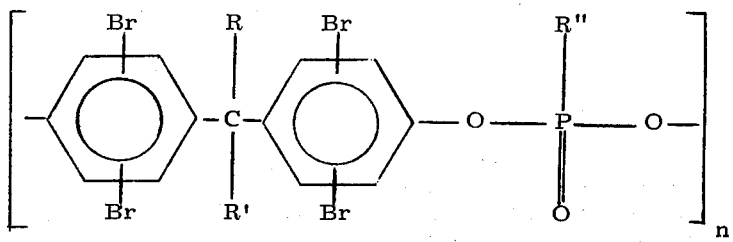

where R and R' are radicals selected from the group consisting of hydrogen, methyl, ethyl, aryl, and brominated aryl; where R" is a radical selected from the group consisting of alkyl, aryl, and brominated aryl; and where $n$ is an integer of from 1 to about 100.

2. The synthetic fibers of claim 1 containing said compound in the amount of about 10–20%.

3. The fibers of claim 1 wherein said ester is polyethylene terephthalate.

4. The fibers of claim 1 wherein $n$ is about 3

5. Fibers of claim 1 wherein the compound is poly(2,2-bis(p-hydroxy-dibromo-phenyl)propane) phenyl phosphonate.

6. The fibers of claim 5 wherein said compound is present in the amount of about 15%.

* * * * *